United States Patent
Li et al.

(10) Patent No.: US 8,341,228 B2
(45) Date of Patent: Dec. 25, 2012

(54) METHOD AND SYSTEM FOR AUTOMATICALLY COLLECTING INFORMATION IN A MESSAGING SYSTEM

(75) Inventors: Jane Li, Beijing (CN); Xue Zhe Liu, Beijing (CN); Che Pan, Beijing (CN); Li Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 12/181,353

(22) Filed: Jul. 29, 2008

(65) Prior Publication Data

US 2009/0037545 A1 Feb. 5, 2009

(30) Foreign Application Priority Data

Jul. 30, 2007 (CN) .......................... 2007 1 0137174

(51) Int. Cl.
*G06F 15/16* (2006.01)
(52) U.S. Cl. ....................... 709/206; 709/204
(58) Field of Classification Search .................... 709/206
See application file for complete search history.

(56) References Cited

U.S. PATENT DOCUMENTS

2004/0049416 A1* 3/2004 Alison et al. .................... 705/10
2008/0162244 A1* 7/2008 Oral et al. .......................... 705/9

FOREIGN PATENT DOCUMENTS

| EP | 000703540 A2 * | 3/1996 |
| JP | 2002-024497 | 1/2002 |
| WO | WO 02/056225 A1 | 7/2002 |
| WO | WO 02056225 A1 * | 7/2002 |

OTHER PUBLICATIONS

China Office Action, 100101, Dated Jan. 25, 2011, translated copy provided, 11 pages.

* cited by examiner

*Primary Examiner* — William Goodchild
(74) *Attorney, Agent, or Firm* — Daniel McLoughlin; Hoffman Warnick LLC

(57) ABSTRACT

A method and system for automatically collecting information in messaging system. A method in accordance with an embodiment includes: setting a flag indicating an information collection and an initiation flag for a message for requesting information collection by an information requestor; generating a unique identifier for identifying a task for the information collection, and sending the message; when replying to the message for requesting information collection, setting a reply flag for a replied message and sending the replied message, wherein information required to be collected is included in the replied message; and extracting the information required to be collected by the task for the information collection identified by the unique identifier from the replied message in accordance with the flag indicating an information collection and the reply flag, consolidating the information into a single summary document, and providing the summary document to the information requester.

17 Claims, 14 Drawing Sheets

FIG. 4B

Summary Document
Please input with your clothes size

| Initiator | admin/pan |
|---|---|
| Created | 05/15/2007 |
| Send to | replier/pan |
| Total | 1 people |
| Replied | 0 people replied (0%) |

Content

| Name | Size | Color |
|---|---|---|
| | | |

Response

FIG. 4C

Summary Document
Please input with your clothes size

| Initiator | admin/pan |
|---|---|
| Created | 05/15/2007 |
| Send to | replier/pan |
| Total | 10 people |
| Replied | 3 people replied (30%) |

Content

| Name | Size | Color |
|---|---|---|
|  |  |  |

Response

| Name | Size | Color |
|---|---|---|
| Replier A | 42 | Red |
| Replier B | 40 | White |
| Replier C | 43 | Blue |

| New Memo | New Collection | Reply | Reply to All | Forward | Delete | Follow Up | Folder | Copy into New | Chat | Show | Tools | sender/pan
Sent by admin/pan
05/15/2007 06:07 PM

To: replier/pan@pan
cc:
bcc:
Subject: Please input your clothes size

| Name | Size | Color |
|---|---|---|
|  |  |  |

FIG. 5B

| Send | Send and File... | Save As Draft | Reply to All | Address... | Delivery Options... | Follow Up ▼ | Show ▼ | Tools ▼ |

☐ High Importance ☐ Return Recipe ☐ Sign ☐ Encrypt replier/pan
Sent by: admin/pan
05/15/2007 06:07 PM To: sender/pan
cc:
bcc:
Subject: Re: Please input your clothes size

| Name | Size | Color |
|---|---|---|
| Replier A | 42 | Red |

▶ sender/pan
sender/pan
Sent by:admin/pan
05/15/2007 06:07 PM

To: replier/pan@pan
cc:
bcc:
Subject: Re: Please input your clothes size

| Name | Size | Color |
|---|---|---|
| | | |

FIG. 5C

METHOD AND SYSTEM FOR AUTOMATICALLY COLLECTING INFORMATION IN A MESSAGING SYSTEM

TECHNICAL FIELD

The present invention relates to the collecting of information using a messaging system, and in particular, relates to a method and system for automatically collecting information in a messaging system.

BACKGROUND ART

Information collection is an important aspect of messaging systems. Available messaging systems, however, do not provide an intelligent function to help an information requestor to collect information from a specific information provider. For example, if a user of a messaging system wants to create a report that requires input from ten other people, the user may perform the following operations: 1) send a request with a report template to the ten people; 2) wait for each person's reply; and 3) collect and summarize each person's input into one file. This process, especially the last step, requires a tremendous amount of effort.

SUMMARY OF THE INVENTION

The present invention provides a mechanism and system for automatically collecting information in a messaging system.

By using an automatic information collection mechanism, a user only needs to send a message to receivers when the user wants to collect information from others. The automatic information collection mechanism will collect information from replied messages automatically, and sends the result to the user after the collection task has been completed.

An aspect of the present invention is directed to a method for automatically collecting information in a messaging system, comprising: setting a flag indicating an information collection and an initiation flag for a message for requesting information collection by an information requestor; generating an unique identifier for identifying a task for the information collection, and sending the message; when replying to the message for requesting information collection, setting a reply flag for a replied message and sending the replied message, wherein information required to be collected is included in the replied message; and extracting the information required to be collected by the task for the information collection identified by the unique identifier from the replied message in accordance with the flag indicating an information collection and the reply flag, consolidating the information into a single summary document, and providing the single summary document to the information requestor.

Another aspect of the present invention is directed to a system for automatically collecting information in a messaging system, comprising: a message type mark module for: setting a flag indicating an information collection and an initiation flag for a message for requesting information collection by an information requestor; generating a unique identifier for identifying a task for the information collection; and setting a reply flag for a replied message when the message for requesting information collection is replied to, wherein the information required to be collected is included in the replied message; a message collector for collecting messages to identify a message replying to the message for requesting information collection in accordance with the flag indicating an information collection and the reply flag; and an information consolidator for: extracting the information required to be collected by the task for the information collection identified by the unique identifier from the replied messages from the message collector; consolidating the information into a single summary document; and providing the summary document to the information requestor.

BRIEF DESCRIPTION OF THE DRAWINGS

FIG. 4 to FIG. 5 illustrate an example show how a system for automatically collecting information according to the present invention works, wherein FIG. 4A to FIG. 4F illustrate a scenario in an initiator part, and FIG. 5A to FIG. 5C illustrate a scenario in a replier part.

DETAILED DESCRIPTION OF THE INVENTION

The present invention provides a tool for automatically collecting information in a messaging system. Generally speaking, the present invention: sends the information to be collected in a message; obtains replies from all receivers; and automatically generates a summary document consolidating all replied information.

Figure 1:
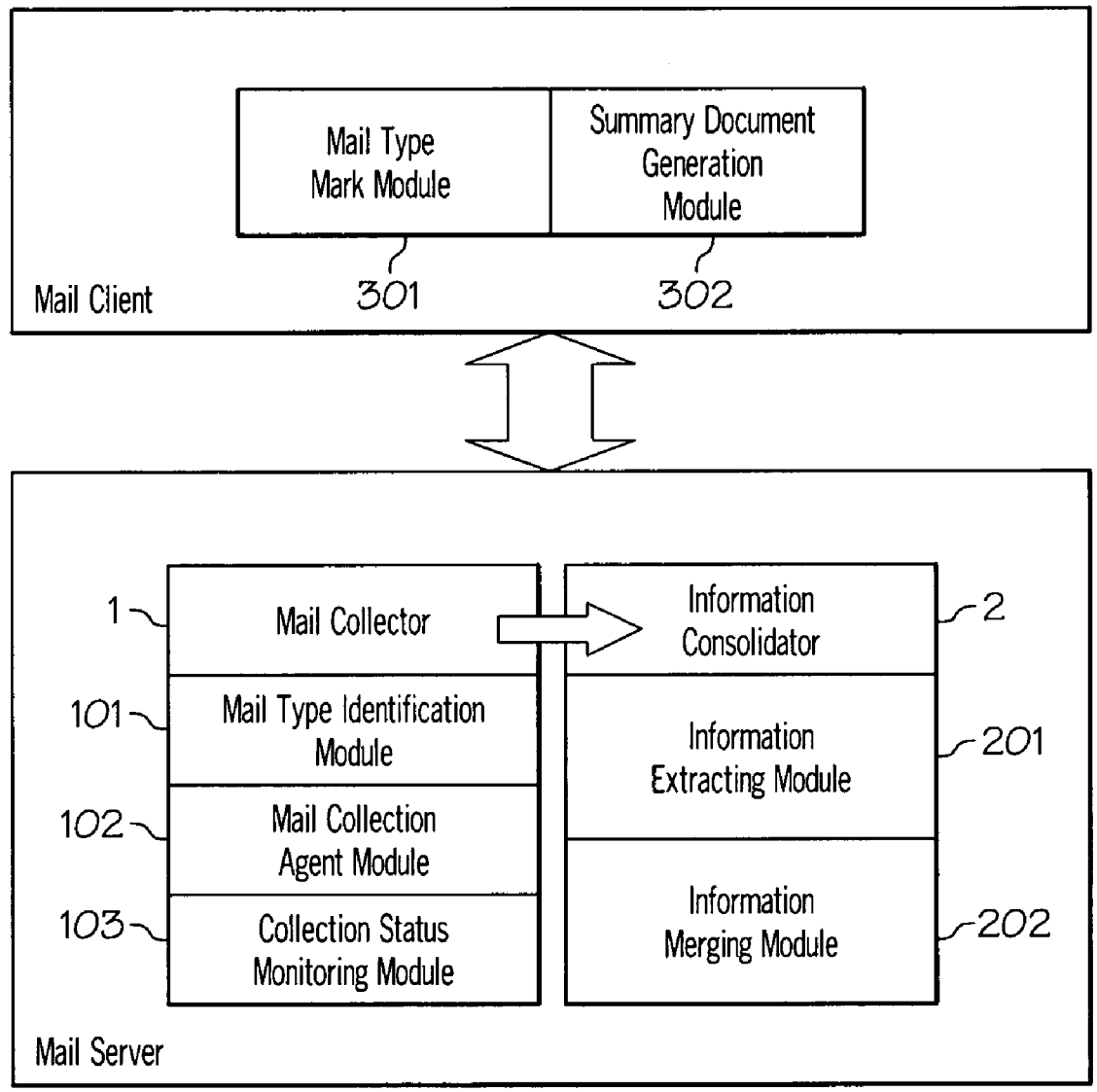
FIG. 1 illustrates a configuration of a system for automatically collecting information according to an embodiment of the present invention.

A configuration of a system for automatically collecting information according to an embodiment of the present invention is described with reference to FIG. 1. FIG. 1 illustrates the application of the present invention in an email system.

The system for automatically collecting information includes: a mail type mark module 301 and a summary document generation module 302 on an email client side; and a mail collector 1 and an information consolidator 2 on an email server side, wherein the mail collector 1 is used for collecting mail and identifying them in a category. The mail collector 1 further includes a mail type identification module 101, a mail collection agent module 102, and a collection status monitoring module 103. The information consolidator 2 is used for performing information consolidation, and further includes an information extracting module 201 and an information merging module 202. Functions of each module will be described below.

The mail type mark module 301 provides a flag for information collection which is necessary for a sender to create an information collection mail and for a replier to reply to the information collection mail. The flag includes a flag indicating an information collection mail and an initiation/reply flag, and generates an unique transaction ID (identifier) for identifying a task for the information collection when the sender (i.e., an information requestor or known as an initiator) creates the information collection mail.

The summary document generation module 302 generates a summary document of replied information when the sender sends the information collection mail. The content of the document will be continuously updated as the information collection progresses.

The primary function of the mail type identification module 101 is to identify whether or not the sender's or the replier's mail is the mail for information collection. When it is confirmed that the sender's or the replier's mail is the mail for collecting information, the mail type identification module 101 transmits the mail and the unique transaction ID thereof to the mail collection agent module 102.

The mail collection agent module 102 receives the mail and the unique transaction ID thereof from the mail type identification module 101. The mail collection agent module 102 identifies different information collection tasks according to the unique transaction ID generated by the mail type mark module 301 for the information collection mail, and sends the information to the extracting module 201 for extracting information. Meanwhile, the mail collection agent module 102 assigns for it a mail classification display attribute for displaying in a category in the mail system, enabling it to be displayed in a special view on the user's mail client.

The collection status monitoring module 103 provides a real-time progress report for the initiator by monitoring the progress of replying the mail with reference to each transaction ID, so that the initiator knows the progress status of the information collection. When the status of the information collection reaches completion, it notifies the initiator that the information collection has been completed.

The mail is delivered to the information extracting module 201 via the mail collection agent module 102 after the replier has provided the content necessary for the information collection and has sent back the replied mail. The information extracting module 201 extracts the replied information to be collected from the mail, and then forwards it to the information merging module 202 for processing. The information merging module 202 merges together the information to be collected which is extracted by the information extracting module 201, and updates the information summary document as the repliers reply the mail, until the information collection ends.

Figure 2:
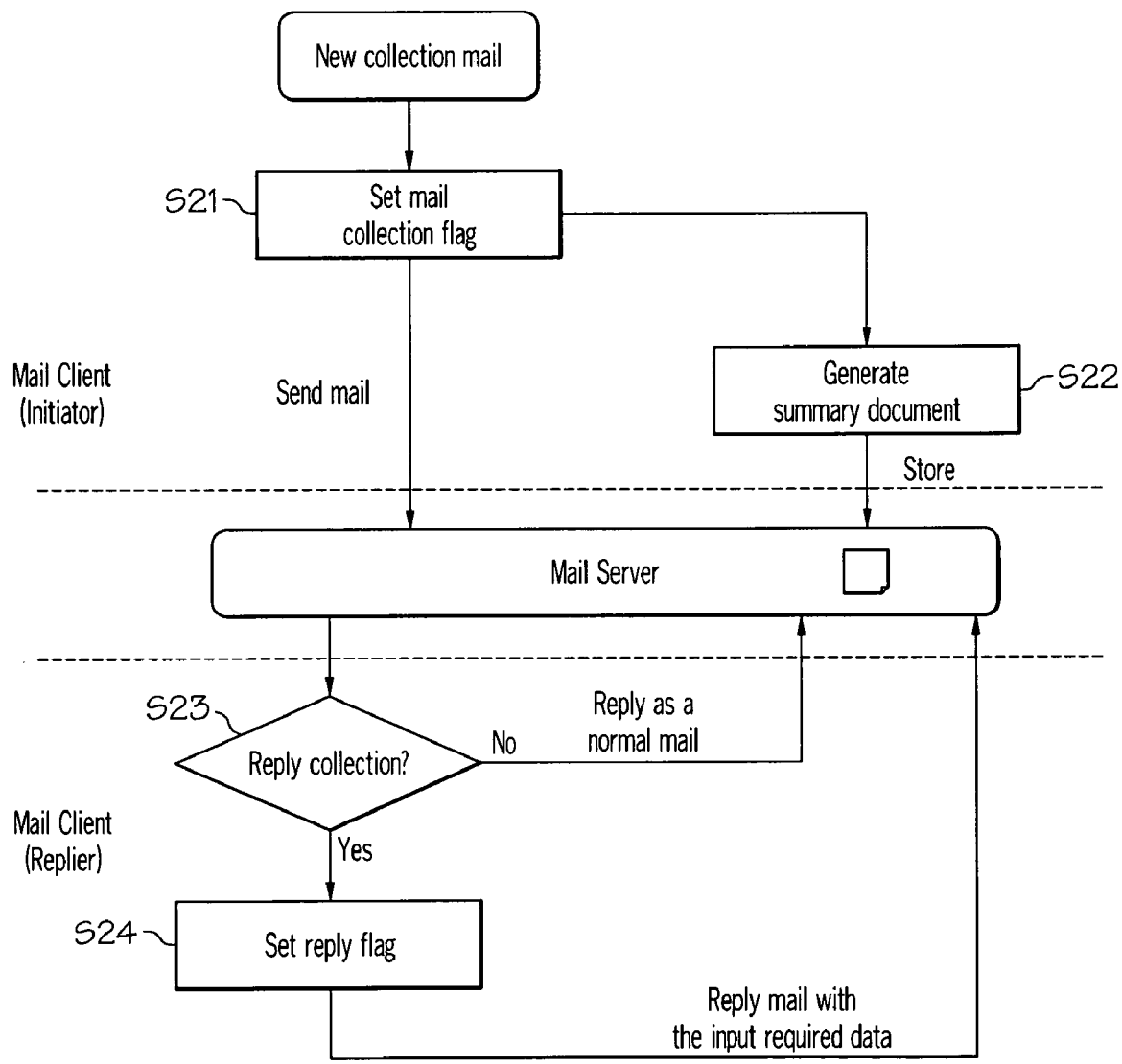
FIG. 2 illustrates a workflow of a system for automatically collecting information according to an embodiment of the present invention as shown in FIG. 1.

A workflow of a system for automatically collecting information according to an embodiment of the present invention as shown in FIG. 1 is described below with reference to FIGS. 2 and 3.

When an initiator (i.e., an information requestor) creates an information collection mail on the mail client, at operation S21, the mail type mark module 301 sets a flag indicating an information collection mail and an initiation flag for the information collection mail, and generates an unique transaction ID. Then at operation S22, the summary document generation module 302 generates a replied information summary document (to be described in detail below) and stores it on the mail server.

On the replier's mail client, when the replier replies the mail, at operation S23, the mail type mark module 301 determines whether the mail is a reply to the information collection. If the mail is not the reply to the information collection, it is sent to the mail server as a normal replied mail. If the mail is the reply to the information collection, the workflow goes to operation S24, where a reply flag is set by the mail type mark module 301, and a reply mail with the information to be collected (the required data) inputted by the replier is sent to the mail server.

Figure 3:
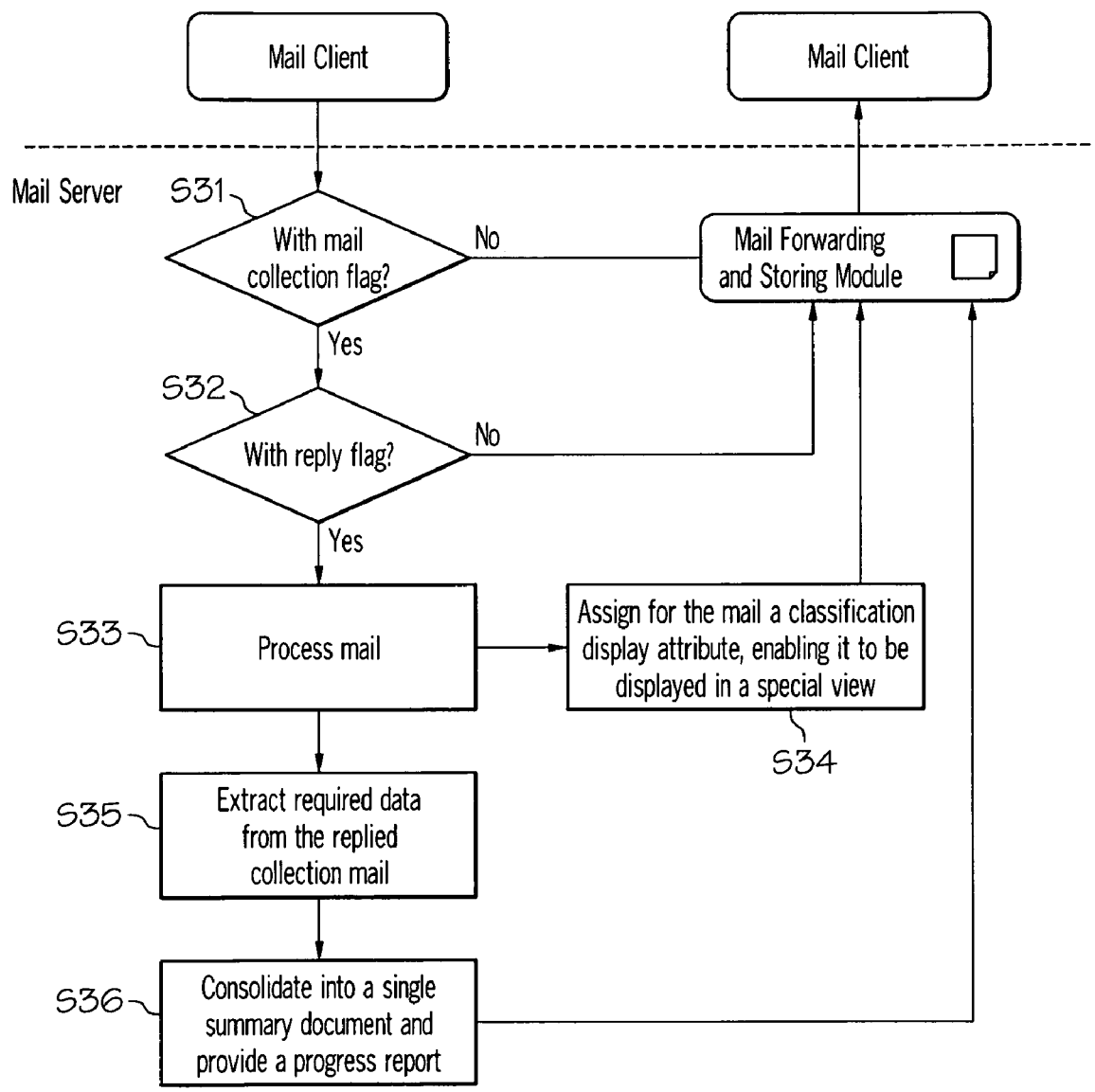
FIG. 3 illustrates a workflow, on a mail server side, of a system for automatically collecting information according to an embodiment of the present invention illustrated as shown in FIG. 1.

FIG. 3 illustrates a workflow, on a mail server side, of a system for automatically collecting information according to an embodiment of the present invention illustrated as shown in FIG. 1.

The mail server receives the mail from the mail client. At operation S31, the mail type identification module 101 determines whether a flag indicating an information collection mail is set for the received mail. If the flag indicating an information collection mail is no set, which represents that the mail is not an information collection mail, the mail is delivered as a normal mail to the mail forwarding and storing module in the mail server so as to be delivered to the destination mailbox. If the flag indicating an information collection mail is set, the workflow goes to operation S32, at which the mail collection agent module 102 further determines whether the received mail is a replied mail by checking the initiation/reply flag. If it is not a replied mail, it is directly delivered to the mail forwarding and storing module. If it is a replied mail, the workflow goes to operation S33, where the mail collection agent module 102 processes the mail, that is, identifies different information collection tasks according to the unique transaction ID so as to be sent to the information extracting module 201 for extracting information. At operation S34, the mail collection agent module 102 also assigns for the mail a mail classification display attribute for use in the mail system, enabling the mail to be displayed in a special view on the user's mail client so as to be viewed by the initiator. After operation S34, the mail collection agent module 102 delivers the replied mail assigned the mail classification display attribute to the mail forwarding and storing module. At operation S35, the information extracting module 201 extracts from the mails delivered via the mail collection agent module 102 the replied information (data) to be collected, and then forwards it to the information merging module 202 for processing. At operation S36, the information merging module 202 merges together the information to be collected which is extracted by the information extracting module 201, and consolidates the information into a single summary document. Moreover, the collection status monitoring module 103 monitors the progress of replying to the mail according to the transaction ID, and provides the initiator with a real-time progress report which can be contained in the summary document.

The summary document and the progress report are stored in the mail forwarding and storing module after operation S36. The mail forwarding and storing module in the mail server forwards the replied mail to the destination mailbox on the mail client side, and provides the initiator with the stored summary document and progress report.

An example is given with reference to FIG. 4A to FIG. 5C to describe how the system for automatically collecting information according to the present invention works.

It is assumed in this example that a secretary (the initiator) is to collect the clothes size and favorite clothes color of the team members, and she needs to send a mail to all of the team members. Then, the system for automatically collecting information will assist her in consolidating all the replies.

Figure 4A:
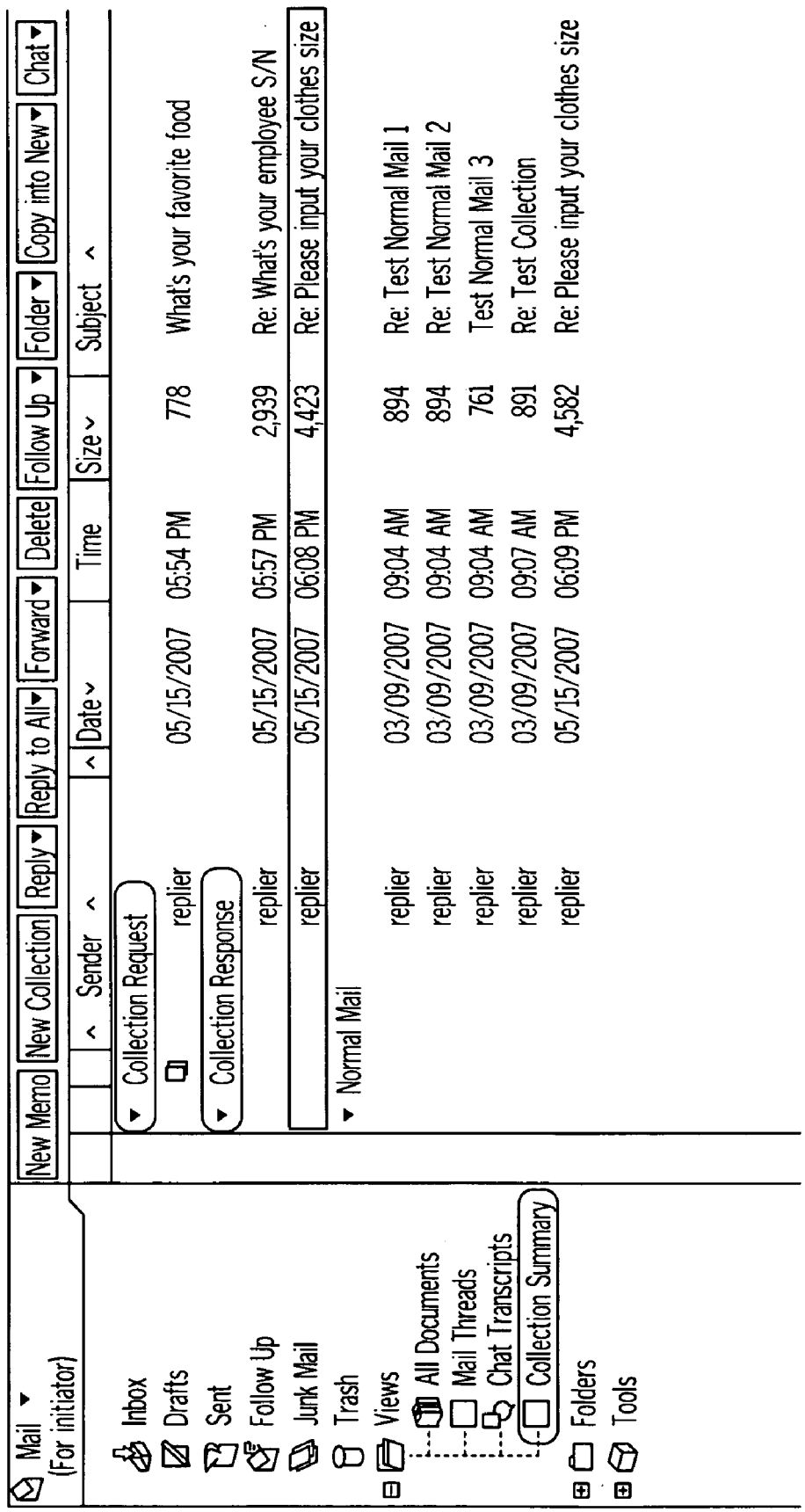
Figure 4B:
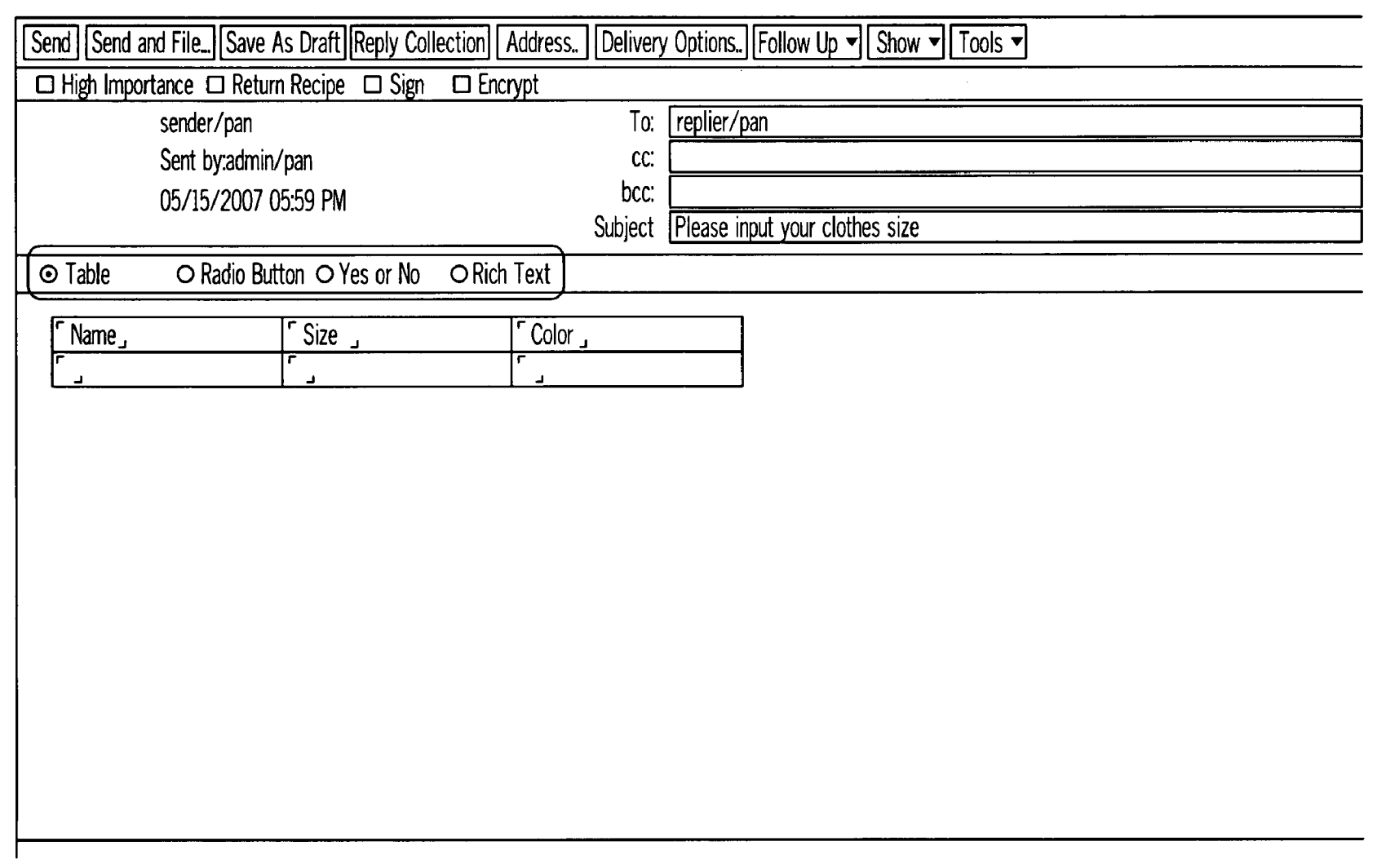
Figure 4D:
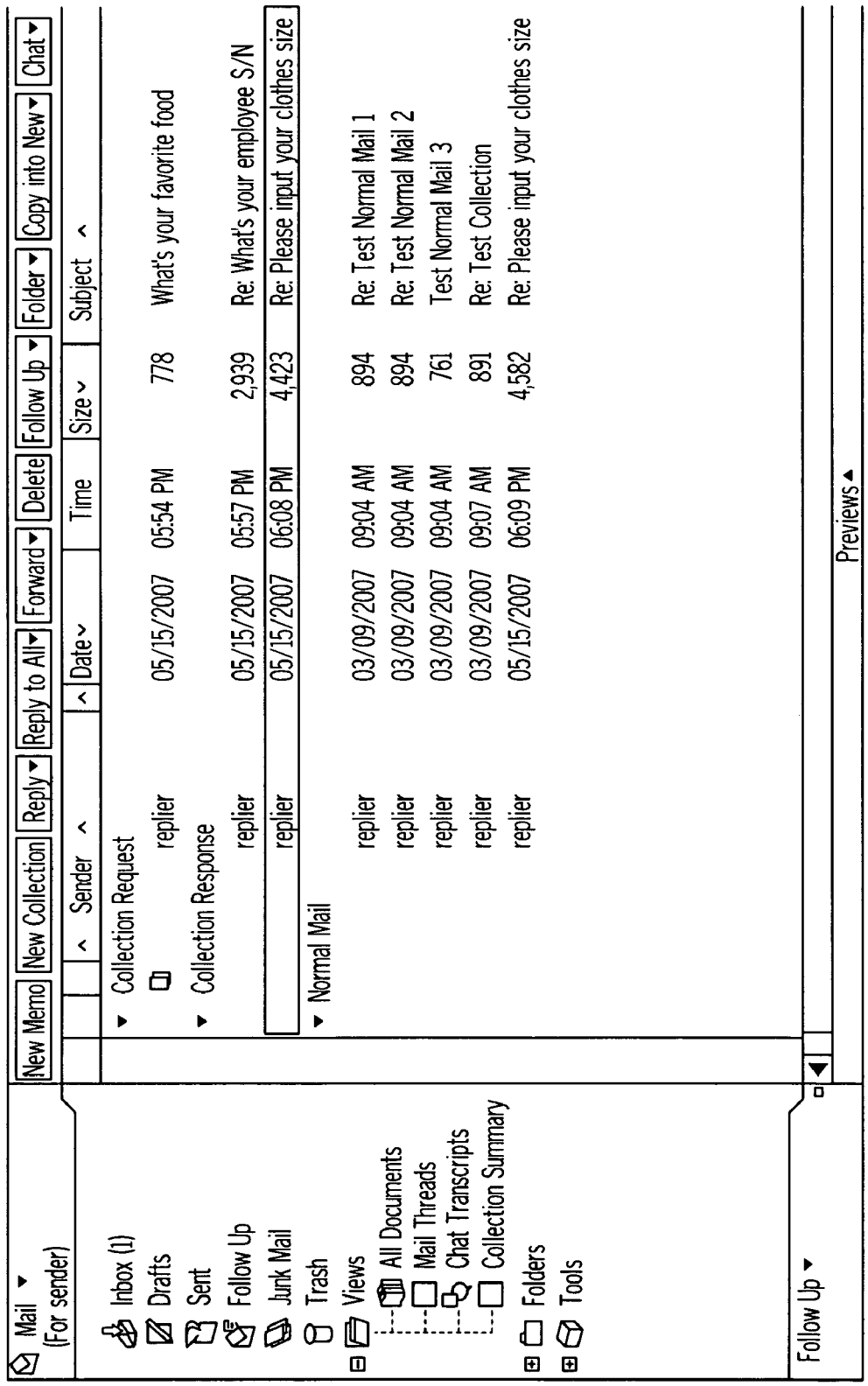
Figures 4E, 4F:
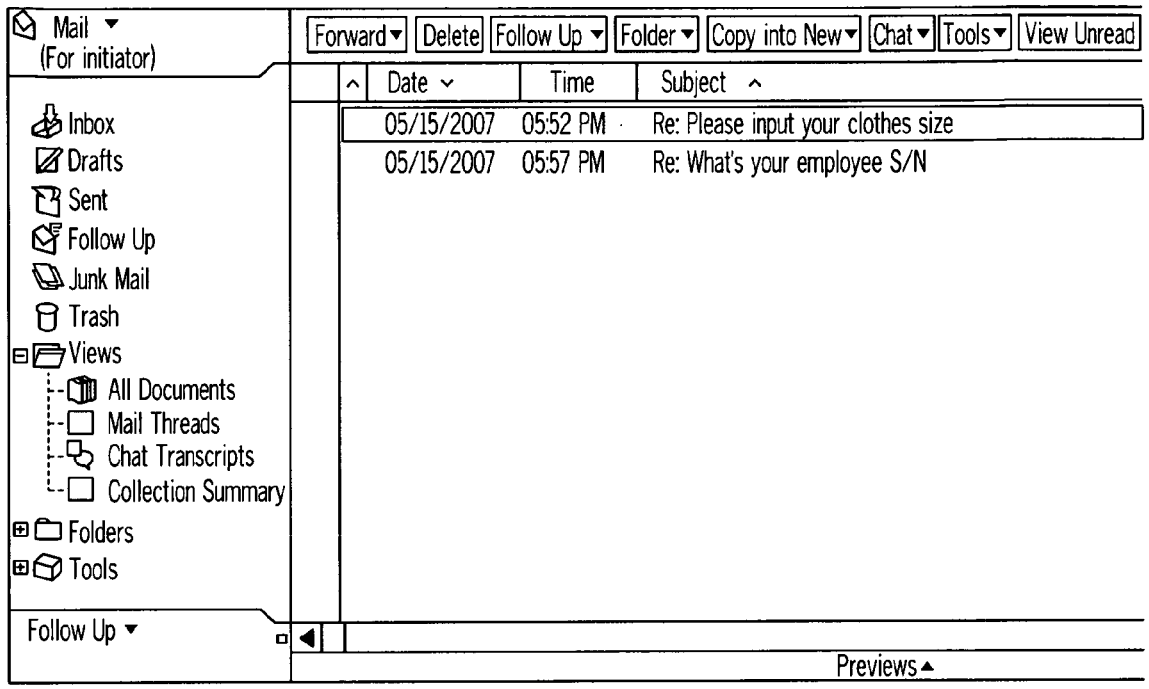
Figure 5A:
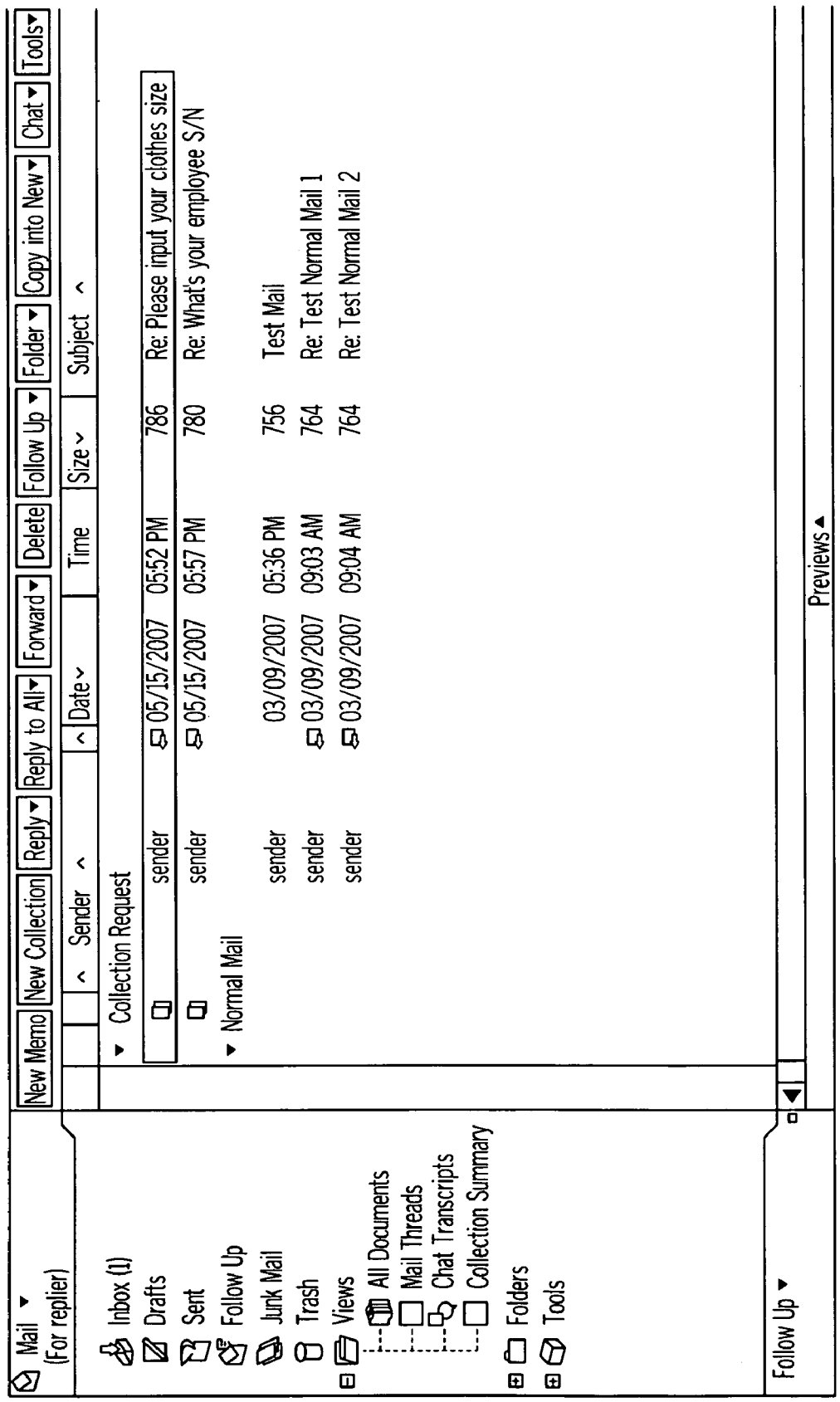

The example is shown as two parts below: an initiator part (FIG. 4A to FIG. 4F) and an replier part (FIG. 5A to FIG. 5C).

In the Initiator Part

The secretary (the initiator) will start working from her inbox. With reference to FIG. 4A, it is the inbox view of the initiator, but the system for automatically collecting information adds some new features to the inbox:

Collection Summary View: the initiator can view all of her collection summary in this view.

New Collection Button: the initiator can click this button to create a new collection request mail.

Collection Request Category: all of the collection request mails are listed in this category, the collection request mails here are used for collecting information from the owner of the inbox, that is, the secretary is also requested to provide information necessary to be collected by another initiator.

Collection Response Category: all of the collection response from the repliers will be listed in this category, the category aggregates all of the replied mails to all of the information collection request initiated by the secretary.

FIG. 4B shows a mail view presented after the initiator clicks the new collection button in the example.

With reference to FIG. 4B, the initiator needs to input in fields of the recipients (To) and the subject after she clicked the new collection button. The following additional functions are provided in the example to assist the initiator in composing the collection: Table, Radio Button, Yes or No, and Rich Text. In this example, the initiator chooses the table and fills in the table with the information she wants to collect: name, size and color, and then clicks the Send button or the Send and File button. The collection will be sent out as a mail with a flag, the flag indicating that it is an information collection mail.

FIG. 4C shows the view of the summary document when the initiator just sent out the new collection mail and there is no reply in the example.

With reference to FIG. 4C, when the initiator sends out a collection request, the system for automatically collecting information will generate a summary document for gathering information from the replied mails, namely the information to be collected. The mail server will extract specific content area from the replier's mail with the flag indicating an information collection mail when it receives the replied mail, and add the extracted content to the summary document. The initiator can view all the information from the repliers who have replied in this summary document at any time.

FIG. 4D shows the initiator's inbox view after the initiator receives the collection response mail in the example.

With reference to FIG. 4D, all these responses will be displayed in the collection response category in the initiator's inbox when a replier makes a response to the collection just sent out by the initiator. These response mails will not be mixed into normal mails.

FIG. 4E shows the collection summary view in the example.

With reference to FIG. 4E, the initiator can turn to the collection summary view to view the summary of all of her collection requests. In this view, it can be seen that the initiator has sent out a collection request with a subject of "please input with your clothes size" at previous steps, and there is also listed another collection request. The initiator can perform multiple information collection tasks, all of the summary documents will be listed in this view. By clicking the summary subject, the initiator can view the details of the collection.

FIG. 4F shows the view of the summary document after the initiator receives responses in this example. FIG. 4F shows the summary document in which 3 responses have been received from 10 requested people. All of the responses have been automatically consolidated by the system for automatically collecting information and are displayed in the response area.

In the Replier Part

FIG. 5A shows the inbox view of the replier when the replier receives the collection request in the example.

With reference to FIG. 5A, the collection request will be listed in the collection request category (refer to the description of the collection request category in FIG. 4A for details) of the replier's inbox view when he receives the request. The replier can click it to open.

FIG. 5B shows the view when the replier opens the collection request mail from the initiator in the example. With reference to FIG. 5B, the system for automatically collecting information adds some new features into the collection request mail view:

Reply Collection: if the replier decides to join in the information collection activity, he can click this button and input his information. If he doesn't want to join, he can click the Reply button or Reply to All button to reply as a normal mail. As such, his reply will be delivered to the initiator as a normal mail, but will not be consolidated by the system for automatically collecting information.

In this example, the replier wants to join in the collection activity, and he clicks the Reply Collection button.

FIG. 5C shows a mail view presented after the replier clicks the Reply Collection button in this example.

With reference to FIG. 5C, the replier can input his information and send out a reply after he clicks the Reply Collection button. In this example, the system for automatically collecting information will provide a table to the replier. The replier doesn't need to copy/paste the table to his reply mail.

The present invention can be applied to other messaging systems in addition to the email system. Messaging systems have similar architecture as the email system to complete storing and forwarding of a message. The system of the present invention does not participate in the storing and forwarding function per se of the message, but intercepts the message halfway, extracts and adds flags, and then performs analyzing and summarizing. To this extent, present invention can be directly applied to other messaging systems, such as instant messaging system, etc.

Figure 6:
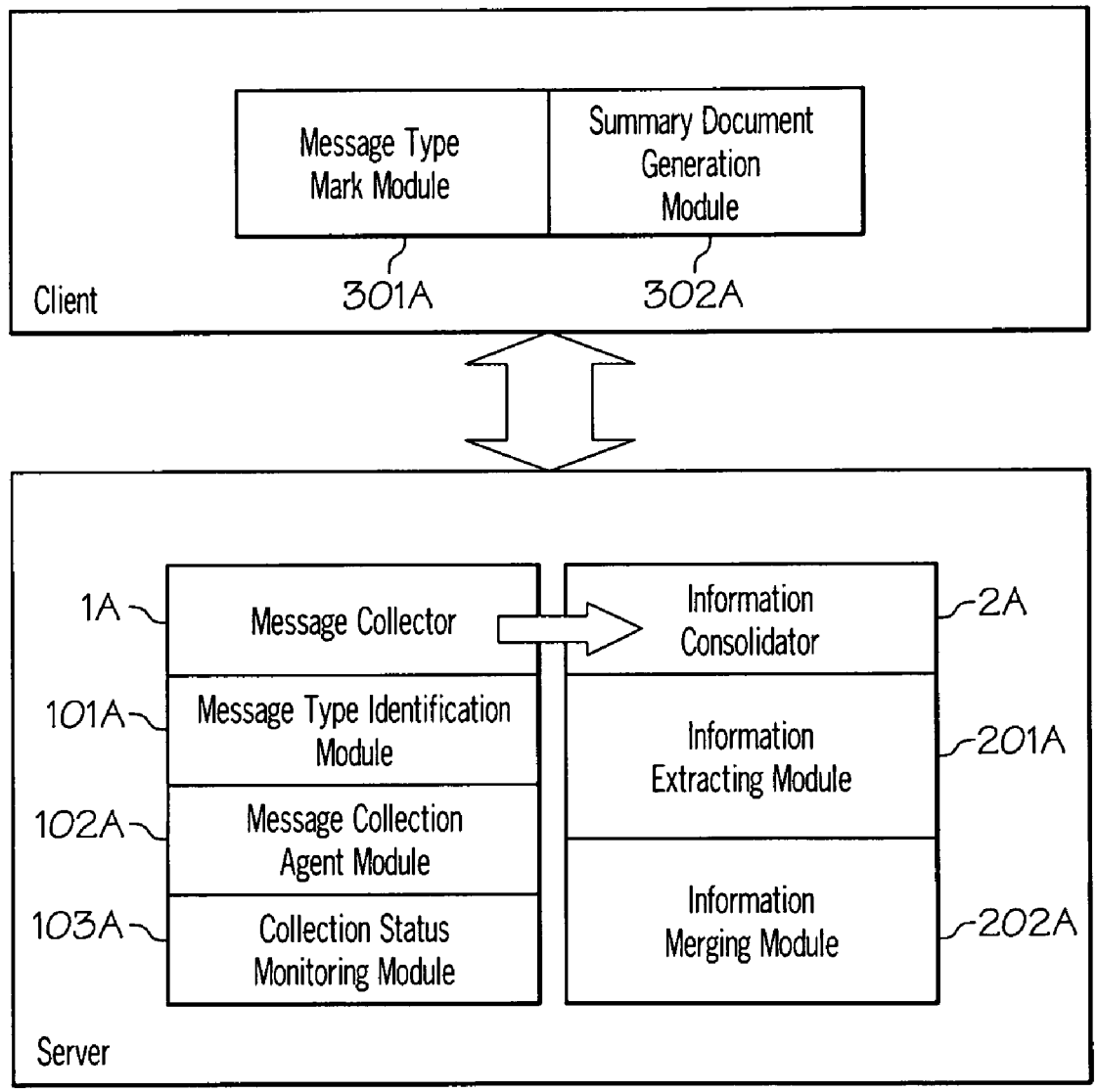
FIG. 6 illustrates a configuration of a system for automatically collecting information according to another embodiment of the present invention.
Figure 7:
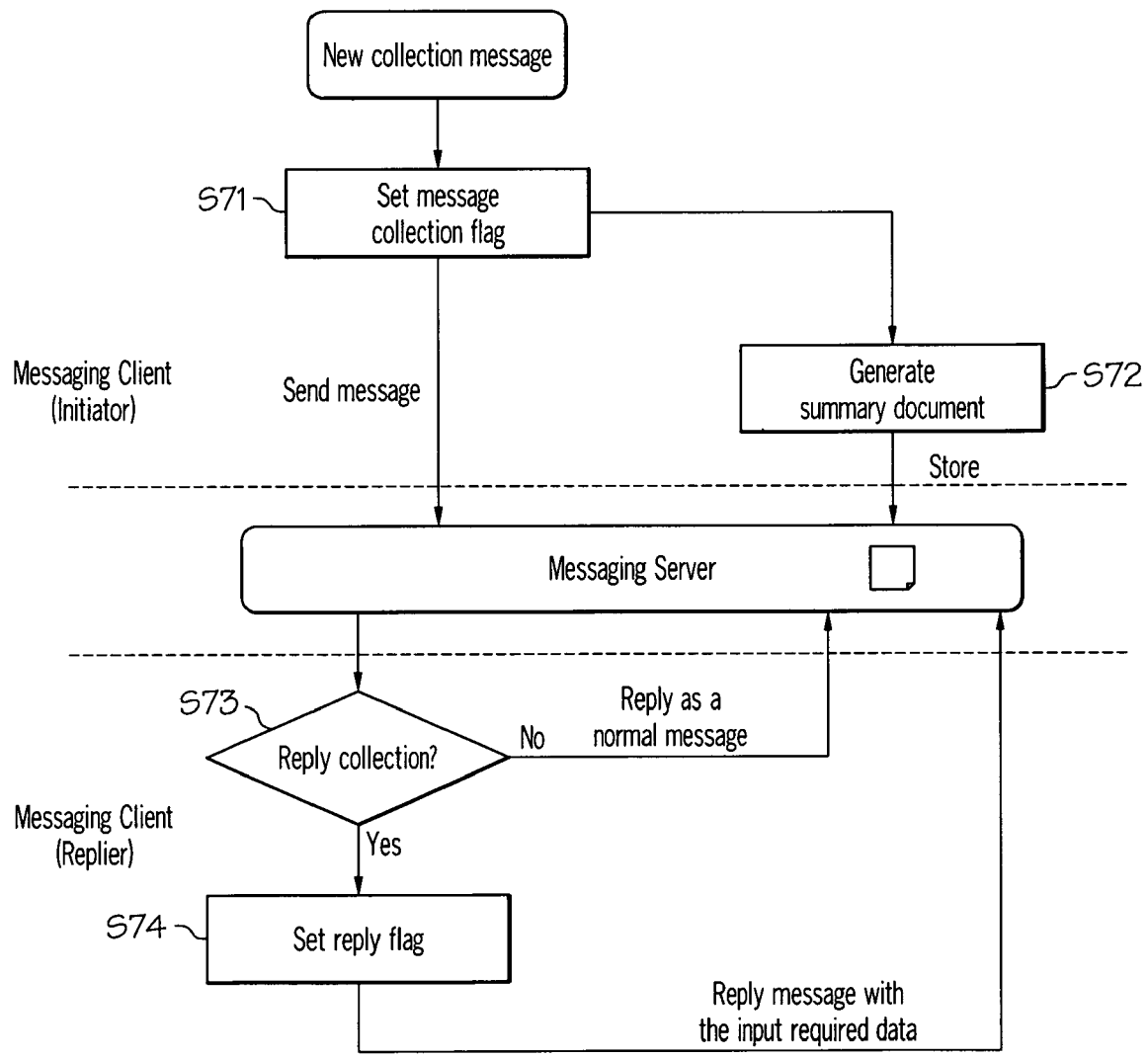
FIG. 7 illustrates a workflow of a system for automatically collecting information according to another embodiment of the present invention illustrated as shown in FIG. 6.
Figure 8:
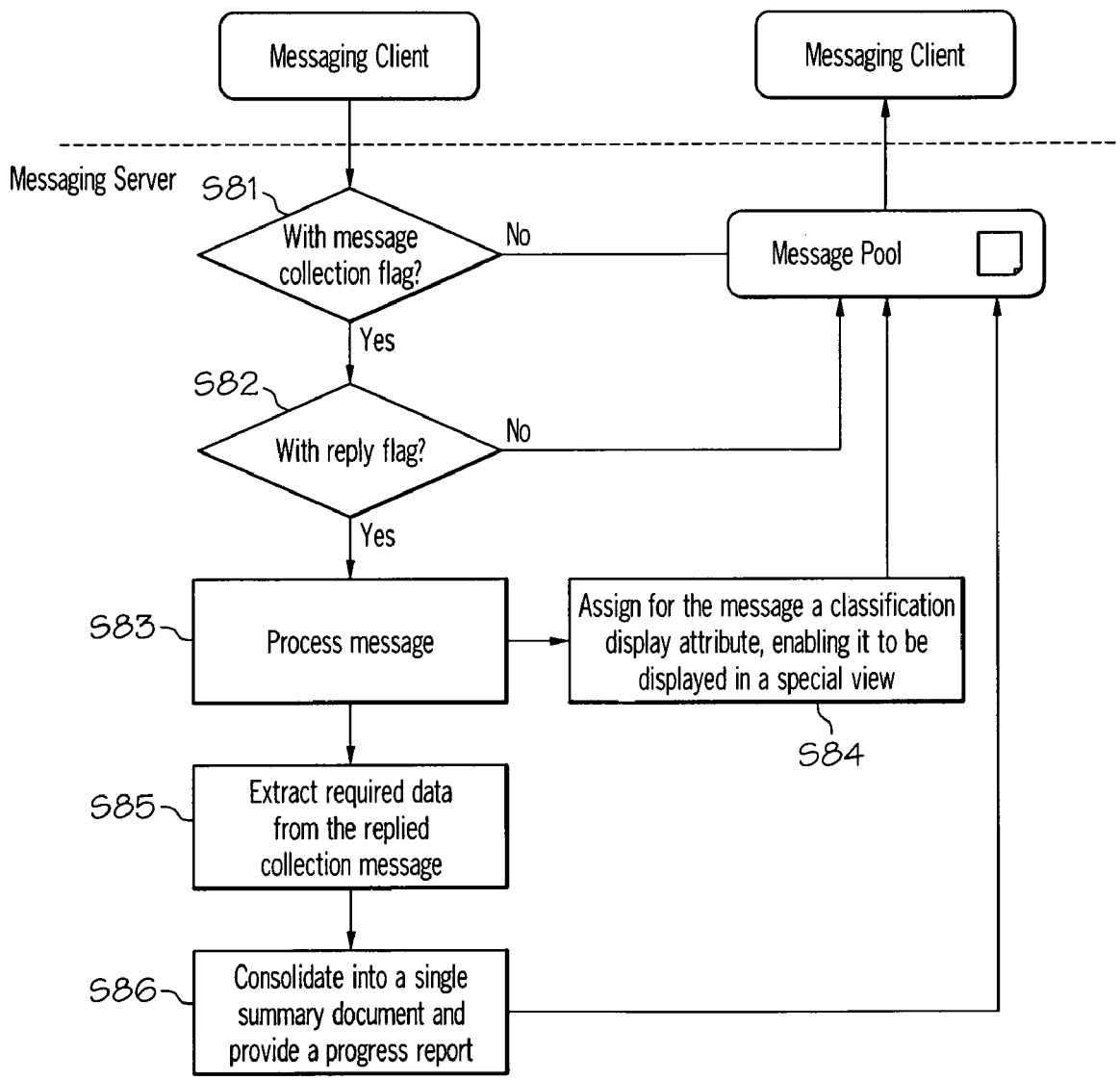
FIG. 8 illustrates a workflow, on a server side, of a system for automatically collecting information according to another embodiment of the present invention illustrated as shown in FIG. 6.

FIG. 6 to FIG. 8 give a configuration and workflow of a system for automatically collecting information when the present invention is applied to general messaging systems, wherein FIG. 6 illustrates a configuration of a system for automatically collecting information according to another embodiment of the present invention, FIG. 7 illustrates a workflow of a system for automatically collecting information according to another embodiment of the present invention illustrated as shown in FIG. 6, and FIG. 8 illustrates a workflow, on a server side, of a system for automatically collecting information according to another embodiment of the present invention illustrated as shown in FIG. 6.

It can be seen from FIG. 6 to FIG. 8 that, when the present invention is applied to a general messaging system, the system configuration and workflow are very similar to those when applied to an email system, the details are described below.

With reference to FIG. 6, a configuration of a system for automatically collecting information according to another embodiment of the present invention is described.

The system for automatically collecting information includes: a message type mark module 301A and a summary document generation module 302A deployed on a client side of a messaging system, and a message collector 1A and an information consolidator 2A deployed on a server side of the messaging system. The message collector 1A is used for collecting messages and identifying them in category, and further includes a message type identification module 101A, a message collection agent module 102A, and a collection status monitoring module 103A. The information consolidator 2A is used for performing information consolidation, and further includes an information extracting module 201A and an information merging module 202A. Functions of the modules therein are similar to the corresponding modules shown in FIG. 1. The function of each module is described below.

When a message sender creates an information collection message and when a message replier replies the message information, the message type mark module 301A provides a flag which is necessary for information collection. The flag including a flag indicating an information collection message and a initiation/reply flag, and generates a unique transaction ID (identifier) for identifying the information collection task when the sender (i.e., the information requestor, or known as initiator) creates the information collection message.

The summary document generation module 302A generates a summary document of replied information when the sender sends the information collection message. The content of the document will be continuously updated as the information collection progresses.

The primary function of the message type identification module 101A is to identify whether or not the sender's or the replier's message is the message for information collection. When it is confirmed that the sender's or the replier's message is the message for collecting information, the message type identification module 101A transmits the message and the unique transaction ID thereof to the message collection agent module 102A.

The message collection agent module 102A receives the message and the unique transaction ID thereof from the message type identification module 101A, and identifies different information collection tasks according to the unique transaction ID generated by the message type mark module 301 for the information collection message so as to send to the information extracting module 201A for extracting information. Meanwhile the message collection agent module 102A assigns for it a message classification display attribute to display in category in the messaging system, enabling it to be displayed in a special view on the user's client of the messaging system.

The collection status monitoring module 103A provides a real-time progress report for the initiator by monitoring the progress of replying to the message with reference to each transaction ID, so that the initiator knows the progress status of the information collection. When the status of the information collection reaches completion, the collection status monitoring module 103A notifies the initiator that the information collection has been completed. The message is delivered to the information extracting module 201A via the message collection agent module 102A after the replier has provided the content necessary for the information collection and sent back the replied message. The information extracting module 201A extracts the replied information to be collected from the message, and then forwards it to the information merging module 202A for processing. The information merging module 202A merges together the information to be collected which is extracted by the information extracting module 201A, and updates the information summary document as the repliers reply the message, until the information collection ends.

A workflow of a system for automatically collecting information according to another embodiment of the present invention shown in FIG. 6 is described below with reference to FIG. 7 and FIG. 8.

When an initiator (i.e., an information requestor) creates an information collection message on the client of the messaging system, at Operation S71, the message type mark module 301A sets a flag indicating an information collection message and an initiation flag for the information collection message and generates an unique transaction ID. Then at operation S72, the summary document generation module 302A generates a replied information summary document (to be described in detail below) and stores it on the server of the messaging system.

On the replier's client of the messaging system, when the replier replies the message, at operation S73, the message type mark module 301A determines whether the message is a reply to the information collection. If the message is not the reply to the information collection, it is sent to the server of the messaging system as a normal replied message. If the message is the reply to the information collection, the workflow goes to operation S74, where a reply flag is set by the message type mark module 301A, and the replied message with the information to be collected (the required data) inputted by the replier is sent to the server of the messaging system.

FIG. 8 illustrates a workflow, on a server side of the messaging system, of a system for automatically collecting information according to another embodiment of the present invention shown in FIG. 6.

The server of the messaging system receives messages from the client of the messaging system. At operation S81, the message type identification module 101A determines whether a flag indicating an information collection message is set for the received message. If the flag indicating an information collection message is not set, which represents that the message is not an information collection message, the message is delivered to the message pool in the server of the messaging system as a normal message so as to be delivered to the messaging destination. If the flag indicating an information collection message is set, the workflow goes to operation S82, where the message collection agent module 102A further determines whether the received message is a replied message by checking the initiation/reply flag. If it is not a replied message, it is directly delivered to the message pool. If it is a replied message, the workflow goes to operation S83, where the message collection agent module 102A processes the message, that is, identifies different information collection tasks according to the unique transaction ID so as to be sent to the information extracting module 201A for extracting information.

At operation S84, the message collection agent module 102A also assigns for the message a message classification display attribute for use in the messaging system, enabling the message to be displayed in a special view on the user's client of the messaging system so as to be viewed by the initiator. After operation S84, the message collection agent module 102A delivers the replied message assigned the message classification display attribute to the message pool. At operation S85, the information extracting module 201A extracts from the messages delivered via the message collection agent module 102A the replied information (data) to be collected, and then forwards it to the information merging module 202A for processing. At operation S86, the information merging module 202A merges together the information to be collected which is extracted by the information extracting module 201A, and consolidates the information into a single summary document. Moreover, the collection status monitoring module 103A monitors the progress of replying the message according to the transaction ID, and provides the initiator with a real-time progress report which can be contained in the summary document. The summary document and the progress report are stored in the message pool after operation S86. The server of the messaging system forwards the replied message to the messaging destination (i.e. the initiator's messaging client) through the forwarding and storing function, and provides the initiator with the stored summary document and progress report.

The present invention can be further enhanced in function. For example, a predefined collection pattern template can be provided. The isomorphic data in replies make it easy to automatically consolidate information in a smaller information granularity (such as cells in a table), which can save the time of the information collection initiator, especially save the time for the information collection initiator to design the template of the information collection.

The present invention can further provide a function of automatically merging attachments, namely, automatically merging the information collection attachments in the information collection request messages, which can save the time for the information collection initiator to open and merge each attachment.

The invention claimed is:

1. A method for automatically collecting information in a messaging system, comprising:
    setting, using a computing device, a flag indicating an information collection and an initiation flag for a message for requesting information collection by an information requestor, wherein the information to be collected is included in the message;
    generating, using the computing device, a unique identifier for identifying a task for the information collection, and sending the message and the unique identifier;
    when replying to the message for requesting information collection, setting, using the computing device, a reply flag for a replied message and sending the replied message and the unique identifier, wherein information required to be collected is included in the replied message;
    identifying, using the computing device, a specific information collection task by the unique identifier for extracting;
    extracting, using the computing device, in response to the identifying, the information required to be collected from the replied message in accordance with the flag indicating an information collection and the reply flag;
    consolidating, using the computing device, the extracted information into a single summary document; and
    providing, using the computing device, the summary document to the information requestor.

2. The method of claim 1, further comprising:
    identifying the task for the information collection according to the unique identifier to perform subsequent processing on the replied message; and
    assigning for the replied message a message classification display attribute used in the messaging system to display the replied message in a special view on a client of the messaging system.

3. The method of claim 1, further comprising:
    monitoring a progress of replies to the message for the task for the information collection identified by the unique identifier; and
    providing the information requestor with a real-time progress report.

4. The method of claim 1, further comprising:
    generating the summary document for merging the information required to be collected after setting the flag indicating an information collection and the initiation flag, the summary document being stored on a server of the messaging system, and the content of the summary document being continuously updated as the reply to the message of information collection progresses.

5. The method of claim 1, wherein if the flag indicating an information collection and the initiation flag are set in the message, the message is a message for requesting information collection;
    if the flag indicating an information collection and the reply flag are set in the message, the message is a message replying to the message for requesting information collection;
    and in other cases, the message is processed as a normal message.

6. The method of claim 1, wherein the summary document and the replied message are provided to the information requestor through a storing and forwarding function of a server in the messaging system.

7. The method of claim 1, further comprising:
    providing a predefined collection pattern template for the messaging system.

8. The method of claim 1, further comprising:
    automatically merging information collection attachments of the messages.

9. A system for automatically collecting information in a messaging system, comprising:
    at least one computing device including:
        a message type mark module for: setting a flag indicating an information collection and an initiation flag for a message for requesting information collection by an information requestor, wherein the information to be collected is included in the message; generating a unique identifier for identifying a task for the information collection; associating the unique identifier with the message; and setting a reply flag for a replied message when the message for requesting information collection is replied to, wherein the unique identifier and the information required to be collected is included in the replied message;
        a message collector for collecting reply messages to the message for requesting information collection in accordance with the flag indicating an information collection and the reply flag; and
        an information consolidator for: identifying a specific information collection task by the unique identifier for extracting; and extracting, in response to the identifying, the information required to be collected from the replied messages from the message collector; consolidating the information into a single summary document; and providing the summary document to the information requestor.

10. The system of claim 9, wherein the message collector includes a message type identification module for making the following determination:
    if the flag indicating an information collection and the initiation flag are set in the message, the message is a message for requesting information collection;
    if the flag indicating an information collection and the reply flag are set in the message, the message is a message replying to the message for requesting information collection;
    and in other cases, the message is processed as a normal message.

11. The system of claim 9, wherein the message collector includes a message collection agent module for: identifying the task for the information collection according to the unique identifier to perform subsequent processing on the replied message; and assigning for the replied message a message classification display attribute used in the messaging system to display the replied message in a special view on a client of the messaging system.

12. The system of claim 9, wherein the message collector includes a collection status monitoring module for: monitoring a progress of replying to the message for the task for the information collection identified by the unique identifier; and providing the information requestor with a real-time progress report.

13. The system of claim 9, further comprising:
a summary document generation module for, after the flag indicating an information collection and the initiation flag are set by the message type mark module, generating the summary document in order to merge the information requested to be collected, the summary document being stored on a server of the messaging system, and the content of the summary document being continuously updated as the reply to the message of information collection progresses.

14. The system of claim 9, wherein the summary document and the replied message are provided to the information requestor through a storing and forwarding function of a server in the messaging system.

15. The system of claim 9, wherein the information consolidator includes:
an information extracting module for: receiving the replied message from the message collection agent module; and extracting the information requested to be collected from the replied message; and
an information merging module for: merging together the information extracted by the information extracting module so as to be consolidated into the summary document; and updating the summary document as the repliers reply the message.

16. The system of claim 9, further comprising:
a module for providing a predefined collection pattern template for the messaging system.

17. The system of claim 9, further comprising:
a module for enabling the information consolidator to automatically merge information collection attachments of the messages.

* * * * *